Patented Jan. 3, 1950

2,493,320

UNITED STATES PATENT OFFICE 2,493,320

SUBSTITUTED DIHYDROIMIDAZOLIUM COMPOUNDS

Horace A. Shonle, Indianapolis, and Edwin R. Shepard, Beech Grove, Ind., assignors to Eli Lilly and Company, Indianapolis, Ind., a corporation of Indiana No Drawing. Application July 14, 1945, Serial No. 605,192

5 Claims. (Cl. 260—309.6)

This invention relates to a group of new organic compounds and more particularly to new substituted dihydroimidazolium compounds.

By this invention we have provided new compositions of matter which may be represented by the following formula:

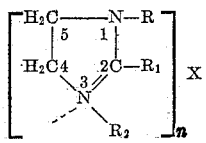

wherein R and $R_1$ are aliphatic hydrocarbon radicals, one of the radicals having from 1 to 7 carbon atoms and the other having from 7 to 18 carbon atoms; $R_2$ is a benzyl radical which may be substituted by halogen or nitro groups; X is an anion; and $n$ is an integer from 1 to 3 inclusive.

The compositions of matter of our invention may be regarded as comprising positively charged dihydroimidazolium cations which are substituted by aliphatic hydrocarbon radicals and a benzyl or substituted benzyl radical, and which are combined with negatively charged anions. The aliphatic hydrocarbon groups may be selected from straight chain saturated, branched chain saturated, and straight and branched chain unsaturated groups such as, for example, the ethyl, isoamyl, and allyl groups. The benzyl group may be unsubstituted or may be substituted by one or more halogen atoms giving rise to chlorobenzyl groups such as, for example, 2-chlorobenzyl and 2,4-dichlorobenzyl groups, and may also be substituted by one or more nitro groups giving rise to nitrobenzyl groups such as, for example, 2-nitrobenzyl and 2,4-dinitrobenzyl groups. The negatively charged anion associated with the imidazolium cation may be any one of a number of negative ions such as, for example, the chloride, bromide, sulfate, acetate or phosphate ions.

By way of example and referring to the above structural formula, when R is a methyl group, $R_1$ a n-decyl group, $R_2$ a benzyl group, X a chloride ion and $n$ is 1, the compound is 1-methyl-2-n-decyl-3-benzyl-4,5-dihydroimidazolium chloride. Additionally, when R is a n-dodecyl group, $R_1$ an isoamyl group, $R_2$ a 2-chlorobenzyl group, X a sulfate ion, and $n$ is 2, the compound is di-[1-n-dodecyl-2-isoamyl-3-(2′-chlorobenzyl)-4,5-dihydroimidazolium] sulfate.

It should be noted that two forms of our compounds exist simultaneously because of a dynamic equilibrium. Thus, compounds of our invention may be represented by either of the following formulae:

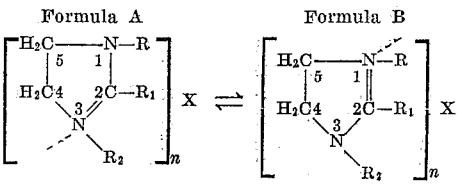

wherein R, $R_1$, $R_2$, X and $n$ have the same significance as before. In Formula A, the nitrogen at position 1 is tertiary, and the nitrogen at position 3 is quaternary. In Formula B, the nitrogen at position 1 is quaternary, and the nitrogen in position 3 is tertiary. In the specification and claims we employ for convenience Formula A, wherein R is attached to the tertiary nitrogen at position 1, and $R_2$ is attached to the quaternary nitrogen at position 3. It will be understood that the two forms illustrated are to be regarded as equivalent and that both forms are to be considered as within the scope of this invention.

The compounds we have invented have several fields of utility. For example, they are effective in reducing the surface tension of aqueous solutions. They have bacteriostatic properties. Additionally, they are possessed of therapeutic qualities which make them suitable for application in the treatment of various bacterial invasions.

Broadly, we may prepare the compounds embodied in our invention by reacting a suitably substituted dihydroimidazole with a member of the class of alkylating or arylating agents such as, for example, the nitrates, sulfates, or halides of alkyl or aryl compounds. It is usually most convenient to employ the halides since they are readily available, and for therapeutic compounds we prefer to use a halide containing an anion commonly employed in therapeutic compounds, such as chlorine, bromine, or iodine. The reaction is effected by mixing the substituted dihydroimidazole with the halide of the desired alkyl or aryl compound, allowing any spontaneous reaction to subside and subsequently heating the mixture to complete the reaction. The product may be purified by recrystallization or precipitation from suitable solvents or mixtures thereof. The theoretical amount of the halide may be used but it is preferable to use an excess to assure completion of the reaction. The reaction is conveniently, although not necessarily, carried out in a closed system thus eliminating any loss of the halide by volatilization. If desired, a suitable nonreactive solvent such as, for example, alcohol or ethyl acetate may be used as a vehicle during the reaction.

It should be noted that the compounds of our invention comprising a mixture of two forms as mentioned heretofore may be prepared by either of two routes. A dihydroimidazole substituted by the groups R and $R_1$ may be arylated by means of an $R_2$-containing arylating agent. Likewise a dihydroimidazole substituted by the groups $R_1$ and $R_2$ may be alkylated by means of an R-containing alkylating agent. The same compound results when R, $R_1$, and $R_2$ are correspondingly identical in each reaction.

The compounds of our invention are salt-like and generally water-soluble, and consequently are subject to many of the ionic reactions which typify soluble inorganic salts. By anionic interchange reactions, one anion may be substituted for another. For example, by taking advantage of the lower solubility of a substituted dihydroimidazolium sulfate as compared with the solubility of the corresponding dihydroimidazolium chloride, the sulfate may be crystallized preferentially from a solution containing the dihydroimidazolium, sulfate and chloride ions. Illustrating another method of effecting this conversion, an aqueous solution of substituted dihydroimidazolium halide may be shaken with substantially insoluble silver sulfate, whereby the halide ion is removed as insoluble silver halide leaving in solution the dihydroimidazolium sulfate. Additionally, ionic interchange may be effected through the hydroxyl ion as an intermediate. Upon shaking an aqueous solution of a substituted dihydroimidazolium halide with silver oxide, there is formed the corresponding soluble dihydroimidazolium hydroxide and insoluble silver halide. Treatment of the soluble dihydro imidazolium hydroxide solution with the appropriate acid forms the desired dihydroimidazolium compound.

The following examples illustrate methods by which we may prepare the new compositions of matter of our invention.

Example 1

1-methyl-2-n-undecyl-3-benzyl-4,5-dihydroimidazolium bromide represented by the formula

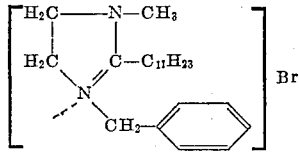

may be prepared by reacting 1-methyl-2-n-undecyl-4,5-dihydroimidazole with benzyl bromide in the following manner:

The 1-methyl-2-n-undecyl-4,5-dihydroimidazole used in the synthesis was prepared by refluxing a mixture of 171 g. of ethyl laurate and 135 g. of anhydrous ethylene diamine at 110–112° C. for 12 hours. The alcohol and excess ethylene diamine were removed by distillation and 172 g. of crude N-lauroyl ethylene diamine was obtained. A mixture of 162 g. of the crude N-lauroyl ethylene diamine and 187 g. of powdered calcium oxide was heated with stirring at 225° C. for 36 hours. The reaction mixture was cooled to room temperature and extracted three times with about 350 cc. of alcohol. The extract was distilled in vacuo and the reaction product, 2-n-undecyl-4,5-dihydroimidazole, distilled at 180–189° C./10 mm. and melted at 81–83° C. To 56.5 g. of the 2-n-undecyl-4,5-dihydroimidazole was added 31.7 g. of dimethyl sulfate, the temperature of the reaction during the addition being maintained at about 85° C. About 150 cc. of water was added and the reaction mixture stirred until the solid material had dissolved. An aqueous solution of 20 g. of 50 percent sodium hydroxide and about 150 cc. of butyl alcohol was added to the reaction mixture with agitation, the mixture filtered and the butyl alcohol layer separated. The reaction product, 1-methyl-2-n-undecyl-4,5-dihydroimidazole, was obtained by evaporation of the butyl alcohol and distillation of the residue at 167–172° C./6 mm.

A cold mixture of 1.8 g. of 1-methyl-2-n-undecyl-4,5-dihydroimidazole and 1.9 g. of benzyl bromide was sealed in a tube and the tube and its contents heated to 110° C. for one hour. The tube was then cooled to room temperature and the contents dissolved in about 50 cc. of boiling ethyl acetate. The hot solution was treated with decolorizing carbon and filtered. The filtrate was cooled to about 0° C. and petroleum ether was added, whereupon 1-methyl-2-n-undecyl-3-benzyl-4,5-dihydroimidazolium bromide separated as an oil. It was purified by redissolving it in hot ethyl acetate, treating the solution with decolorizing carbon, filtering and reprecipitating with petroleum ether, whereupon the 1-methyl-2-n-undecyl-3-benzyl-4,5-dihydroimidazolium bromide was again obtained as an oil which was dried in a vacuum desiccator over sulfuric acid.

Example 2

1-n-amyl-2-n-undecyl-3-benzyl-4,5-dihydroimidazolium bromide represented by the formula

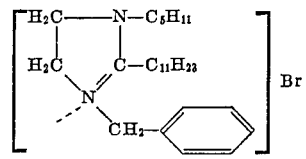

may be prepared by reacting 1-n-amyl-2-n-undecyl-4,5-dihydroimidazole with benzyl bromide in the following manner:

The 1-n-amyl-2-n-undecyl-4,5-dihydroimidazole used in the synthesis was prepared by treating the 2-n-undecyl-4,5-dihydroimidazole described in Example 1 with n-amyl chloride in the following manner: To 84.9 g. of 2-n-undecyl-4,5-dihydroimidazole heated to 140–150° C. were added dropwise 21.7 g. of n-amyl chloride. The temperature of the reaction mixture was held at 147–154° C. for a total of 16 hours. The reaction mixture was cooled to about 60° C. and a solution of 17.1 g. of 50 per cent sodium hydroxide in a mixture of about 150 cc. of water and 150 cc. of butyl alcohol was added to the reaction mixture with agitation and the agitation continued for one hour. The butyl alcohol layer was then separated and distilled to remove the butyl alcohol and water and the residue distilled at reduced pressure. 1-n-amyl-2-n-undecyl-4,5-dihydroimidazole distilled at 145–180° C./5 mm.

A cold mixture of 1.5 g. of 1-n-amyl-2-n-undecyl-4,5-dihydroimidazole and 1.9 g. of benzyl bromide was sealed in a tube. Upon warming to about room temperature, the contents of the tube reacted spontaneously, after which reaction the tube was heated to 110° C. for one hour. The tube was then cooled to about room temperature, its contents dissolved in about 40 cc. of hot ethyl acetate and the hot solution treated with decolorizing carbon and filtered. No precipitate was obtained upon cooling the filtrate to about 0° C. The filtrate was thereupon treated with an excess of petroleum ether which precipitated as an oil the 1-n-amyl-2-n-undecyl-3-benzyl-4,5-dihydroimidazolium bromide. The oil was purified by dissolving it in hot ethyl acetate, treating with decolorizing carbon, filtering and adding an excess of petroleum ether to reprecipitate the 1-n-amyl-2-n-undecyl-3-benzyl-4,5-dihydroimidazolium bromide as an oil which was dried in a vacuum desiccator over sulfuric acid.

*Example 3*

1 - n - amyl - 2 - n - undecyl - 3 - (2' - chlorobenzyl)-4,5-dihydroimidazolium bromide represented by the formula

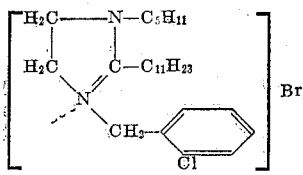

may be prepared by reacting 1-n-amyl-2-n-undecyl-4,5-dihydroimidazole with 2-chlorobenzyl bromide using the same procedure as described in Example 2 for the preparation of 1-n-amyl-2-n-undecyl-3-benzyl-4,5-dihydroimidazolium bromide.

1 - n - amyl - 2 - n - undecyl - 3 - (2' - chlorobenzyl)-4,5-dihydroimidazolium bromide was isolated as an oil which was dried in a vacuum desiccator over sulfuric acid.

*Example 4*

1 - n - decyl - 2 - methyl - 3 - benzyl - 4,5-dihydroimidazolium bromide represented by the formula

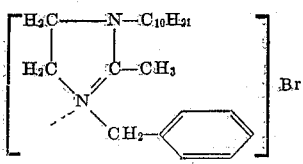

may be prepared from 1-n-decyl-2-methyl-4,5-dihydroimidazole and benzyl bromide in the following manner:

1-n-decyl-2-methyl-4,5-dihydroimidazole was prepared by heating a mixture of 203 g. of N-acetyl ethylene diamine and 560 g. of finely powdered calcium oxide to 225–235° C. for 14 hours. After cooling to 90–100° C. the mixture was extracted with three 500 cc. portions of alcohol. The alcohol was evaporated and the residue upon distillation at 195–198° C. yielded 2-methyl-4,5-dihydroimidazole. A mixture of 50.4 g. of 2-methyl-4,5-dihydroimidazole, 52.8 g. of n-decyl chloride and 100 cc. of benzene was refluxed for seven hours and then cooled to 25° C. A solution of 24 g. of 50 percent sodium hydroxide solution in 150 cc. of water was added, the mixture filtered and the benzene layer separated from the filtrate. The benzene was removed in vacuo and the crude 1-n-decyl-2-methyl-4,5-dihydroimidazole distilled at 155–156° C./6 mm.

A cold mixture of 1.8 g. of 1-n-decyl-2-methyl-4,5-dihydroimadazole and 1.7 g. of benzyl bromide was sealed in a tube and the tube was heated at 100–110° C. for two hours. The tube was then cooled to room temperature, its contents dissolved in about 40 cc. of boiling ethyl acetate and the solution treated with decolorizing carbon and filtered. Upon cooling the filtrate to about 0° C. 1-n-decyl-2-methyl-3-benzyl-4,5-dihydroimidazolium bromide separated as a hygroscopic solid. It was recrystallized from hot ethyl acetate.

*Example 5*

1-n-tetradecyl-2-methyl-3-benzyl-4,5-dihydroimidazolium bromide represented by the formula

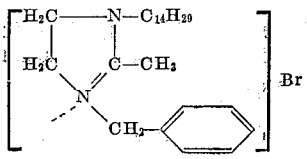

may be prepared by reacting 1-n-tetradecyl-2-methyl-4,5-dihydroimidazole with benzyl bromide as follows:

The 1-n-tetradecyl-2-methyl-4,5-dihydroimidazole was obtained by a method analogous to that used in the preparation of 1-n-decyl-2-methyl-4,5-dihydroimidazole described in Example 4.

A mixture of 1.5 g. of 1-n-tetradecyl-2-methyl-4,5-dihydroimidazole and 1.9 g. of benzyl bromide was sealed in a tube and heated to 110° C. for one hour. The contents of the tube were dissolved in 50 cc. of hot ethyl acetate, treated with decolorizing carbon and filtered. Upon cooling the filtrate to about 0° C. a crystalline precipitate of 1-n-tetradecyl-2-methyl-3-benzyl-4,5-dihydroimidazolium bromide separated. The precipitate was recrystallized from ethyl acetate, whereupon it melted at about 79–80° C.

*Example 6*

1-n-octadecyl-2-methyl-3-benzyl-4,5- dihydroimidazolium bromide represented by the formula

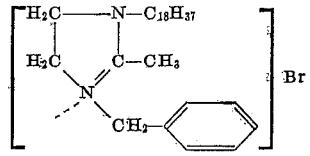

may be prepared by reacting 1-n-octadecyl-2-methyl-4,5-dihydroimidazole with benzyl bromide by the method used for the preparation of 1-n-decyl-2-methyl-3-benzyl-4,5- dihydroimidazolium bromide described in Example 5.

1-n-octadecyl-2-methyl-3-benzyl-4,5-dihydroimidazolium bromide melted at about 90–92° C.

*Example 7*

1-methyl-2-n-heptyl-3-(2'-chlorobenzyl) - 4,5-dihydroimidazolium bromide represented by the formula

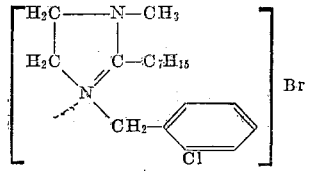

may be prepared by reacting 1-methyl-2-n-heptyl-4,5-dihydroimidazole with 2-chlorobenzyl bromide.

The 1-methyl-2-n-heptyl-4,5-dihydroimidazole was prepared by methods analogous to those used in the preparation of 1-methyl-2-n-undecyl-4,5-dihydroimidazole described in Example 1.

A mixture of 1.5 g. of 1-methyl-2-n-heptyl-4,5-dihydroimidazole and 2.2 g. of 2-chlorobenzyl bromide was sealed in a tube and the mixture heated to 110° C. for one hour. The contents of the tube were dissolved in about 50 cc. of hot ethyl acetate, the solution treated with decolorizing carbon and filtered. Upon cooling the filtrate to about 0° C. a crystalline precipitate of 1-methyl-2-n-heptyl-3-(2'-chlorobenzyl)-4,5-dihydroimidazolium bromide separated. The precipitate after recrystallization from ethyl acetate melted at about 104–105° C.

*Example 8*

1-n-octyl-2-methyl-3-benzyl-4,5-dihydroimidazolium bromide represented by the formula

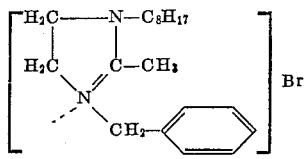

may be prepared by reacting 1-n-octyl-2-methyl-4,5-dihydroimidazole with benzyl bromide as follows:

The 1-n-octyl-2-methyl-4,5-dihydroimidazole used in the preparation was prepared by a method analogous to that used for the preparation of 1-n-decyl-2-methyl-4,5-dihydroimidazole described in Example 4.

1.5 grams of 1-n-octyl-2-methyl-4,5-dihydroimidazole was reacted with 1.9 g. of benzyl bromide by the method used in the preparation of 1-n-tetradecyl-2-methyl-3-benzyl-4,5-dihydroimidazolium bromide described in Example 5.

1-n-octyl-2-methyl-3-benzyl-4,5-dihydroimidazolium bromide melted at about 56–57° C.

*Example 9*

1-n-heptyl-2-methyl-3-benzyl-4,5-dihydroimidazolium bromide represented by the formula

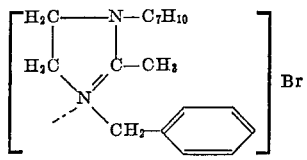

may be prepared by reacting 1-n-heptyl-2-methyl-4,5-dihydroimidazole with benzyl bromide by the method used for the preparation of 1-methyl-2-n-undecyl-3-benzyl-4,5-dihydroimidazolium bromide described in Example 1.

The 1-n-heptyl-2-methyl-4,5-dihydroimidazole was prepared by a method analogous to that used for the preparation of 1-n-decyl-2-methyl-4,5-dihydroimidazole described in Example 4.

1-n-heptyl-2-methyl-3-benzyl-4,5-dihydroimidazolium bromide was isolated as an oil which was dried in a vacuum desiccator over sulfuric acid.

*Example 10*

1-methyl-2-n-nonyl-3-benzyl-4,5-dihydroimidazolium bromide represented by the formula

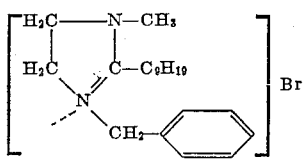

may be prepared by reacting 1-methyl-2-n-nonyl-4,5-dihydroimidazole with benzyl bromide by the method used in the preparation of 1-methyl-2-n-undecyl-3-benzyl-4,5-dihydroimidazolium bromide described in Example 1.

The 1-methyl-2-n-nonyl-4,5-dihydroimidazole was prepared by a method analogous to that used for the preparation of 1-methyl-2-n-undecyl-4,5-dihydroimidazole described in Example 1.

1-methyl-2-n-nonyl-3-benzyl-4,5-dihydroimidazolium bromide was isolated as an oil which was dried in a vacuum desiccator over sulfuric acid.

*Example 11*

1-methyl-2-n-heptadecyl-3-benzyl-4,5-dihydroimidazolium bromide represented by the formula

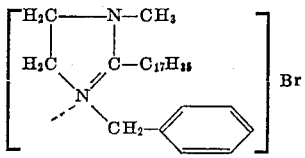

may be prepared by reacting 1-methyl-2-n-heptadecyl-4,5-dihydroimidazole with benzyl bromide in a sealed tube according to the method used in the preceding examples.

The 1-methyl-2-n-heptadecyl-4,5-dihydroimidazole used in the reaction was obtained by a method similar to that used for preparing 1-methyl-2-n-undecyl-4,5-dihydroimidazole described in Example 1.

We claim as our invention:

1. A composition of matter represented by the formula:

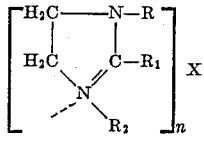

wherein R and $R_1$ are aliphatic hydrocarbon radicals, one of the radicals having from 1 to 7 carbon atoms and the other having from 7 to 18 carbon atoms; $R_2$ is a member of the class consisting of benzyl, monochlorobenzyl, dichlorobenzyl, mononitrobenzyl and dinitrobenzyl radicals; X is an anion and $n$ is an integer from 1 to 3 inclusive.

2. A composition of matter represented by the formula:

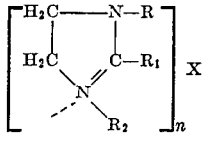

wherein R and $R_1$ are saturated aliphatic hydrocarbon radicals, one radical having from 1 to 7 carbon atoms and the other having from 7 to 18 carbon atoms; $R_2$ is a member of the class consisting of benzyl, monochlorobenzyl, dichlorobenzyl, mononitrobenzyl and dinitrobenzyl radicals; X is an anion and $n$ is an integer from 1 to 3 inclusive.

3. 1-methyl-2-n-nonyl-3-benzyl-4,5-dihydroimidazolium bromide represented by the formula:

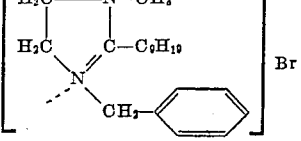

4. 1 - n - octyl - 2 - methyl - 3 - benzyl - 4,5 - dihydroimidazolium bromide having the formula:

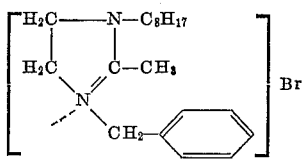

5. 1 - n - heptyl - 2 - methyl - 3 - benzyl - 4,5-dihydroimidazolium bromide having the formula:

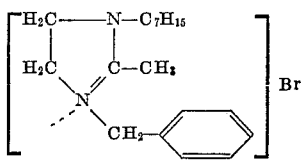

HORACE A. SHONLE.
EDWIN R. SHEPARD.

REFERENCES CITED

The following references are of record in the file of this patent:

UNITED STATES PATENTS

| Number | Name | Date |
|---|---|---|
| 2,042,023 | Schonhofer | May 26, 1936 |
| 2,392,326 | Kyrides | Jan. 8, 1946 |
| 2,404,299 | Kyrides | July 16, 1946 |
| 2,404,300 | Kyrides | July 16, 1946 |

FOREIGN PATENTS

| Number | Country | Date |
|---|---|---|
| 501,727 | Great Britain | Feb. 28, 1939 |